UNITED STATES PATENT OFFICE.

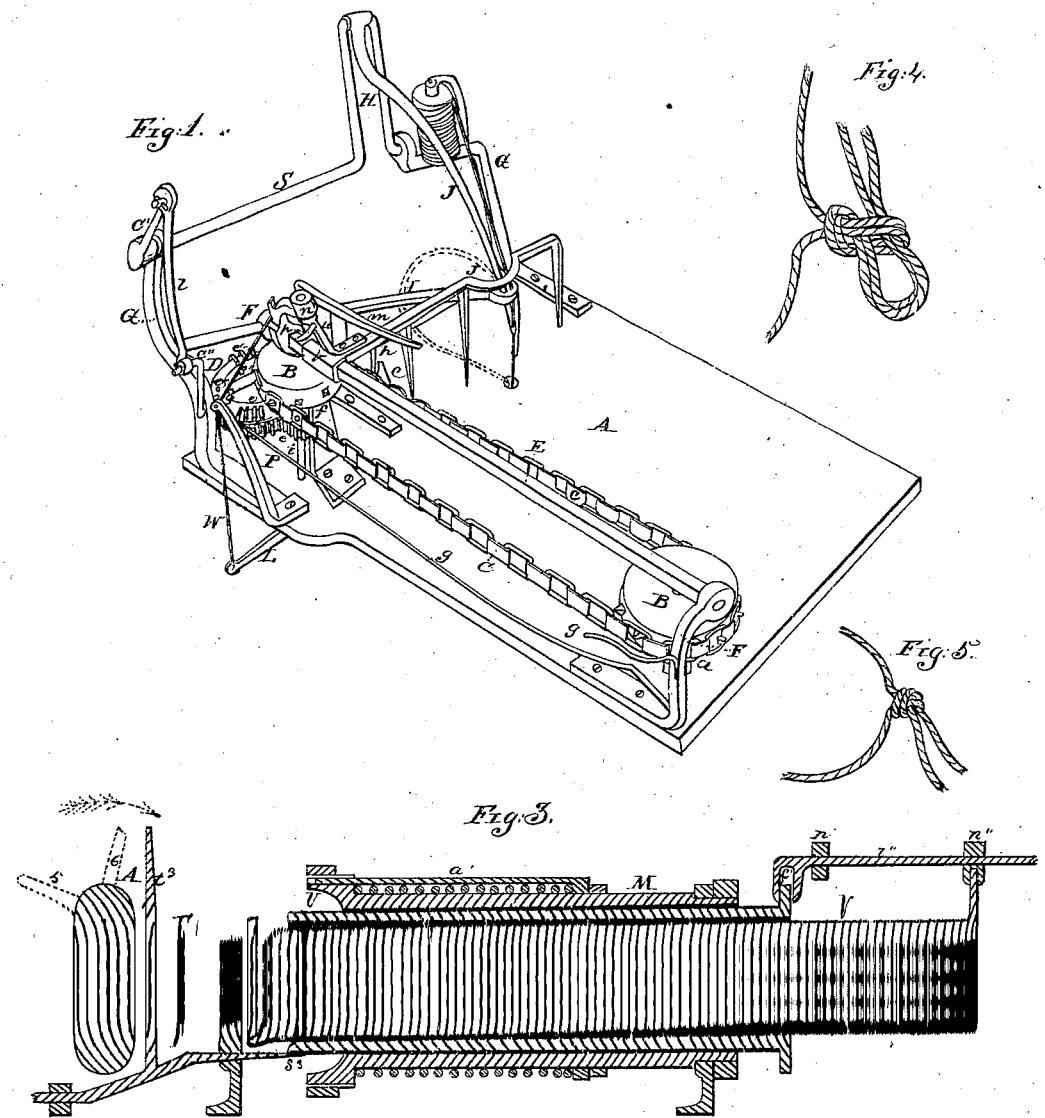

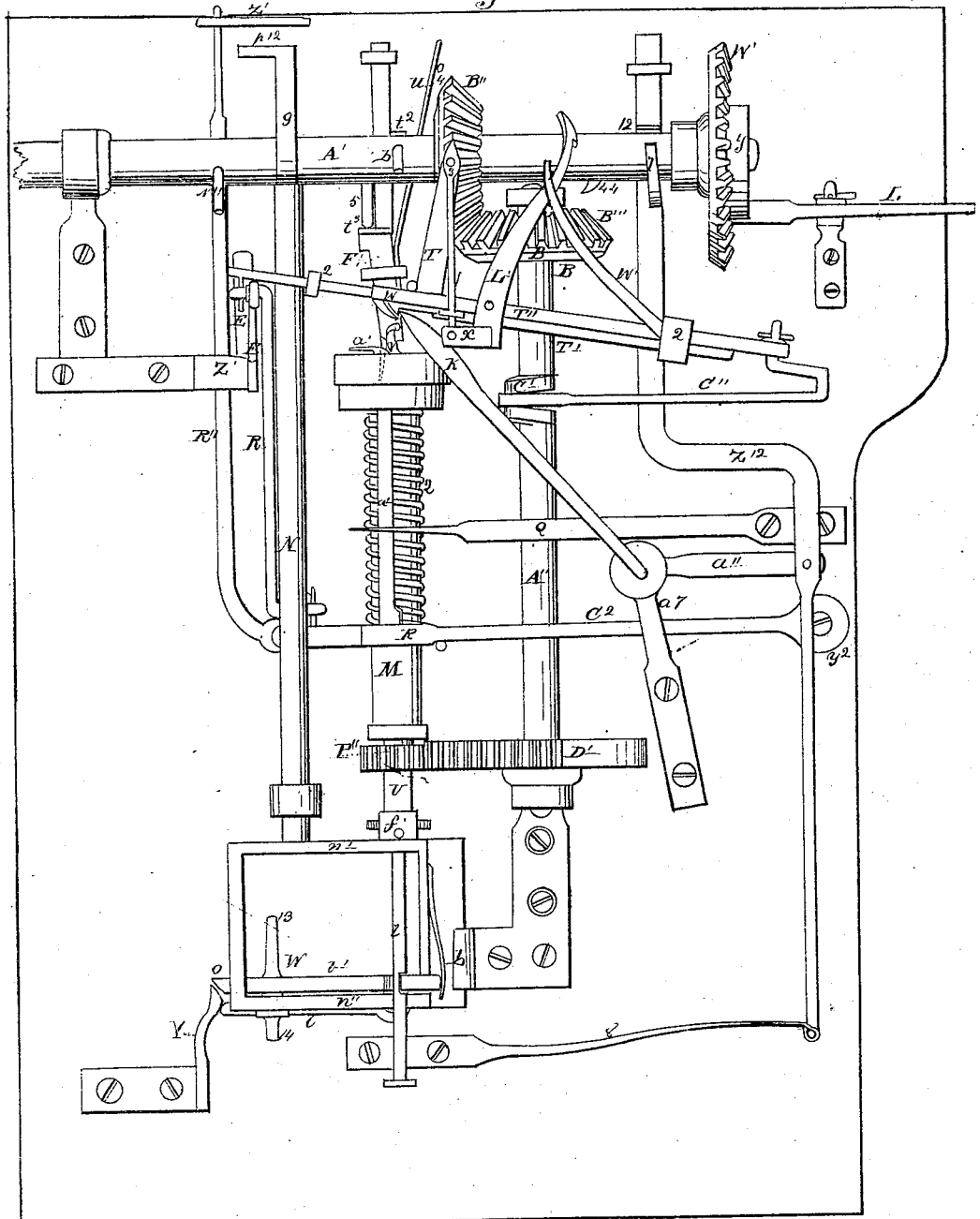

FRANCIS W. RANDALL, OF TEKONSHA, MICHIGAN.

IMPROVEMENT IN GRAIN-BINDERS.

Specification forming part of Letters Patent No. 110,498, dated December 27, 1870; antedated December 17, 1870.

*To all whom it may concern:*

Be it known that I, FRANCIS W. RANDALL, of Tekonsha, in the county of Calhoun and State of Michigan, have invented a new and useful Improved Automatic Raker and Binder; and I do hereby declare the following to be a full, clear, and exact description thereof, sufficient to enable those skilled in the art to which my invention appertains to make and use the same, reference being had to the accompanying drawings, forming part of this specification, and in which—

Figure 1 is a perspective view, showing the upper side of the platform with the raking apparatus. Fig. 2 is an inverted plan view, showing the binding mechanism. Fig. 3 is a detail view, to be hereinafter referred to; and Figs. 4 and 5 are views of the knot with which the binding-cord of the sheaf is tied.

My invention consists in the construction, arrangement, and combination of parts, as hereinafter described, connected with a reaper-platform, for automatically raking the cut grain and binding the sheaves with cord of twine tied in a tight knot.

I will now proceed to describe the raking mechanism, which is visible above the platform.

Referring to the drawings, wherein similar letters indicate like parts in the several figures, A represents the reaper-platform, which is shown out of proportion, for want of space. B is a cogged pulley mounted on a standard fixed in the platform, and B' is a similar pulley on a vertical shaft, $i$, turning in a bracket, $f$, attached to the platform A. E is a rock-bar, turning in bearings in brackets F F attached to the platform. The rake-head is formed with a hollow elongated bearing, $b$, through which passes loosely the guide-rod or rock-shaft E. The rake is thus allowed a movement back and forth over the platform, but it is made to rise and fall as the rock-shaft E turns, which can be effected by making the said rock-shaft and the bearing $b$ angular in cross-section, or by a spline and groove in a round rod and bearing. The backward and forward motion of the rake is effected as follows: The toothed pulleys B B' carry an endless gear-chain, C, to which is attached a dog, $c$. As the pulleys B B' are rotated (by means of gearing to be hereinafter described) the dog $c$ comes alternately in contact with pins $p$ $p'$ attached to the rake-head on opposite sides of the bearing $b$. The shaft $i$ of the cogged pulley B' is provided with a beveled pinion, which engages with a corresponding gear-wheel, W', Fig. 2, on the main shaft A' situated below the platform, and driven by means of a crank or otherwise. $m$ represents a tilting rod, which is made in about the form shown and rigidly attached to the guide-rod E. This tilting rod is traversed by a roller, $n$, on the end of the rake-head. $g$ is a stationary guide-bar fixed at its ends to the platform and formed with an incline, which when mounted by the roller $n$ causes the rake to fall into working position on the platform. A short upper guide-rod, $g'$, may be attached to the bracket F, above the highest part of the guide $g$, to prevent the premature descent of the rake. The rocking motion of the guide-rod E is effected through the medium of a cord or flexible wire, $w$, which connects the head of the tilting device $m$ with a lever, L, pivoted to the under side of the platform, and operated by contact with a cam, $y'$, on the face of wheel W'. (See Fig. 2.) The cord or wire $w$ passes through an eye in the post P attached to the platform.

The operation of the rake is as follows: We will suppose the rake to be at the beginning of the stroke, that is, at the opposite end of the platform from that which it occupies in Fig. 1. The machinery being set in motion, the dog $c$ on the endless chain comes in contact with the pin $p$ and thus carries the rake forward, with the gavel, to the binding apparatus, the roller $n$ of the rake-head traversing the inner side of the arm $m$, as represented in Fig. 1. At this juncture, the outer end of the lever L being suddenly depressed by the action of cam $y$, the rod E, with the rigid arm $m$, will be partially rotated by means of the connection $w$, thereby raising the rake from the platform and tilting it over backward just in time for the dog $c$ to catch the pin $p'$ on the rake-head and run the rake back in its tilted position to the starting-point, the roller $n$ traveling on the guide $g$ and mounting its incline, thereby throwing the rake forward onto the platform, the premature descent of the rake being prevented by the guide $g'$.

I will now proceed to describe the binding mechanism, beginning with devices whereby the binding-twine is passed around the sheaf or gavel, which mechanism is shown in Fig. 1, being situated above the platform. S H is a crank-shaft, mounted in bearings in standards G G attached to the platform. To the crank H is hung the curved cord-carrier J, which I denominate a needle. This cord-carrier has an eye near its lower end, through which passes the binding-twine from the spool, which is mounted on the bracket G. The cord-carrier is guided by passing through a bearing in a bent bar, I, secured to the platform. This bearing is situated at about the center of the path of the rake, and is sufficiently high from the platform to allow the gavel to be raked under it. The rake-head is bent at $x$ to make room for the needle. On the end of the shaft S H is an arm, $c'$, and this is connected, by means of a rod, $r$, with the crank $c''$ of a shaft, $s'$, which has its bearings in the bracket G and the post of the arm I. The shaft $s'$ is provided with a pinion which engages successively with toothed portions $e'$ on the face of a gear-wheel, D. This wheel D gears with a pinion, $e$, on the shaft $i$, and receives its motion therefrom. By the engagement of the pinion on the shaft $s'$ with the separated series of teeth $e'$, an intermittent motion is imparted to the crank-shaft S H, whereby the point of the cord-carrier is depressed through an opening in the platform and held there during the tying of the band and then elevated to receive a fresh gavel.

I will now describe the construction and arrangement of the parts shown in Fig. 2, whereby the end of the band which encircles the gavel is clamped, the twine next the spool is secured to maintain the connection for forming other bands, the twine is cut, the knot tied, and the bound sheaf discharged. Previous to describing the devices I will say that they are usually mounted on a bed which may be adjustably secured to the reaper-platform, and the operating parts are incased to protect them from dust and injury. After describing the construction and arrangement of the parts, a description of their operation will be given. The operating parts all receive their motion from the main shaft $A'$.

$A''$ is a shaft arranged at right angles to the shaft $A'$, and receiving motion therefrom by means of the beveled gear-wheels $B''$ $B'''$.

M, Figs. 2 and 3, represents the tying-cylinder, fitted to turn in bearings attached to the platform and receiving an intermittent rotary motion from the shaft $A''$ by means of a wheel, $D'$, thereon gearing with the pinion $p''$ on the cylinder M, only a portion of the periphery of the wheel $D'$ being toothed. $a'$ represents a bar working through a slot in the front part of the tying-cylinder. This bar has a hook at the front end, and at its rear extremity is bent so as to encircle the tying-cylinder. $C^2$ is a lever, pivoted at $y^2$ to the platform and jointed to a rod, $R''$, the front end of which slides through a guide, $z'$, at the front of the platform. The lever $C^2$ is connected with the bar $a'$ at its rear end, and thus, by the action of the tappet 11 on the shaft $A'$ against a projection on the rod $R''$, the hooked end of the bar $a'$ is projected beyond the end of the tying-cylinder to seize the ends of the band-twine, which are then clamped between the hook $a'$ and the cylinder by the expansion of the spring 2 encircling the tying cylinder between the head of the cylinder and the collar R of the bar $a'$. It is understood, of course, that this spring 2 is compressed when the lever $C^2$ is moved forward. Q is a spring-bar, attached at one end to the platform and having a notch near its opposite extremity, which catches over the bar $a'$ and holds the tying-cylinder steady during the time the pinion $p''$ is out of gear with the wheel $D'$.

$T''$ is a flat bar, which has a reciprocating movement in bearings $z$ $z$ attached to the under side of the platform, the movement being effected by means of a crank-connection, $c'$ $c''$, with the shaft $A''$. $L'$ is a curved lever, pivoted to the bar $T''$ and vibrated by a tappet, 4, on the shaft $A'$. $x'$ is an offset at the short end of the lever $L'$, which is connected with a spring, 1, secured to an arm, T, extending from the bar $T''$. The spring 1 passes through a staple on a bar, $T'$, which has a longitudinal movement in the bearing $z$ independent of the movement of the bar $T''$, which movement is effected by means of the tappet 4, lever $L'$, and spring 1. $w'$ is an arm attached to the bearing $z$ and extending over the lever $L'$ to keep it in place. On the bar $T''$ is a projection, $u'$, between which and the contiguous end of the bar $T'$ the end of the binding-twine from the spool is secured.

K represents the knife, having a bent-down portion, which has its bearing in a bracket, $a^7$, attached to the platform. This bent-down portion is stepped in the platform, and has attached to it an arm, $a''$, which is connected with the bent bar $z^{12}$. This latter is provided with a projection, 12, and the shaft $A'$ has a tappet, 7, which, acting against said projection, moves the bar $z^{12}$ forward. The return-motion of the bar $z^{12}$ and the cutting-motion of the knife are caused by a spring, 8. (Shown clearly in Fig. 2.) This knife cuts the twine, leaving the ends of the band clamped to the cylinder ready for the tying of the knot.

The mechanism for tying the knot is as follows:

U is a tube passing loosely through the tying-cylinder and connected at its rear end with a rod, $r^2$, which has its bearings in the sides $n'$ $n''$ of a rectangular frame attached to a rod, N, and guided in a bracket, $b^6$, secured to the under side of the platform. The motion of the rod N and attached frame from the tying-cylinder is effected by the action of a cam, 9, on the shaft A against the end of the rod, and the motion in the opposite direction is caused by the action of an offset, $p^{12}$, of the cam 9 on an arm of a bell-crank lever, E, pivoted to a bracket, Z', and connected with the rod N by a rod, R'.

$l$ represents one portion of a right-angular iron centrally pivoted to the bed. This device is operated by means of prongs 13 14 attached to the rear bar $n''$ of the rectangular frame $n'$ $n''$, the prongs acting on the part $l$ of the angle-iron which is between them. The motion of the angle-iron is limited by means of a pin fixed in the platform on each side of that part of the iron which is at right angles to the leg $l$. The end of that leg of the angle-iron which corresponds to the part $l$ is bent up so as to stop the backward movement of the tube U, for a purpose to be hereinafter described. $b'$ is a rod fitted to slide in bearings in the rectangular frame attached to the rod N, and having a notch in its upper side to receive the rod $r''$, which is also notched, as shown. This rod $b'$ is made to engage with the rod $r''$ by means of a spring at one side, as shown, and the disengagement is effected by the projecting end $o$ of the rod $b'$ coming in contact with an arm, Y, attached to the bed.

V represents the looping-rod, which passes loosely through the tube U, and has a hook at its forward extremity to form the loop. This rod is secured to the rear bar of the rectangular frame $n'$ $n''$, as shown in Fig. 3, and therefrom receives its motion.

F' is a bar, pointed at $s^3$, and moved back and forth in its bearings by tappets 5 6 on the main shaft acting against projections $t^2$ $t^3$ on the bar F'. This device is seen clearly in Fig. 3. Its office is to hold the ends of the band-twine against the tube U, for a purpose to be presently explained. A spring, $u^4$, presses laterally against the bar F to render it steady.

The kind of knot which these tying devices form is represented in Fig. 4 before the ends of the double twine have been drawn through the loop. Fig. 5 shows the knot drawn tight. This knot resembles the "overhand knot," but is made with double twine and reversed looping.

The operation is as follows: Sufficient binding-twine having been wound on the spool, the loose end is passed through the guide-hole in the arm I next the needle-bar bearing and through the needle-eye, and thence through an opening in the platform A to the hook-jaws of the bars T' and T'', where it is sprung in by hand when the bars are on the full dead-center on the side shown in Fig. 2. The needle is now up. When the rake, operated from the reaper, as hereinbefore described, rakes the cut grain against the binding-twine below the needle-eye, said grain forces the twine back past the needle-point, unwinding it from the spool, (which should have a proper tension.) The needle then descends, as previously explained, passing the twine over the sheaf, and the rake tilts upward, and is carried back on the rod E for another gavel. The band-twine is now clamped to the tying-cylinder at $a'$. This clamp is opened at the proper time to catch the band-twine by means of tappet, 11, on shaft A' impinging against a stud on the rod R'', and closes when disengaged from the tappet by the action of spring 2. The twine next the spool is then transferred to and secured between the hook-jaws, and the whole cut off ready for tying the knot. This transfer is effected as follows: The needle-bar is recessed on one side near the end and above the eye to enable the pointed hook of the bar T'' to hook onto the band-twine on that side of the needle, and when the lever L', by its impingement on tappet 4, has drawn back the spring-bar T', the tension draws the twine down the incline of the hook between the two jaws, where it is firmly secured, and thus when the band is cut the original connection of the twine from the spool is automatically renewed on the formation of each band. The hook-jaw bars are now at rest, while the crank C' is passing its opposite dead-center, and a cam-projection on shaft A'' lifts the catch Q, and the cylinder begins to revolve by reason of the teeth of the wheel D' engaging with its pinion $p''$. At this time the end of the tube U protrudes through the cylinder beyond its head, and the clamped band-ends and the looping-rod protrude beyond the end of the tube, as shown in section, Fig. 3. When the cylinder revolves it carries the clamped ends of the band about one and three-fourths times around the tube, but while the twines are being thus wound another agent comes into play, viz, the finger-bar F', actuated by the tappets 5 and 6. The duty of this bar is to follow up the winding cord, and by means of its tapering point hold the same firmly against the tube. During this winding movement the coupling-rod $x''$ of the tube is locked by the spring-bar $b'$ to the link-frame, and the tube and looping-rod are pushed by the cam $g$ slowly into the cylinder until the motion of the tube is arrested by striking against one arm of the angle-iron $l$. At this time, and when the cylinder has made about three-fourths of a turn, the interception of the finger $s^3$ causes the clamped ends of the band to be looped into the notch of the looping-rod V, and the coupling-rod $r''$ being unlocked from the link-frame by the impingement of the locking-bar $b'$ against the cam-stud Y, the tube is held stationary by the angle-iron, while the liberated looping-rod V, moving with the link-frame, draws the ends of the band-twine through the loop and completes the knot; for the parts are so arranged that when the band-twine is looped over the coil the tappet 11 opens the clamping-jaws $a'$ and liberates the ends of the band. One of the prongs at W has now reached the angle-iron and swung it so as to clear the end of the tube, and the tube and the looping-rod advance still farther to extricate themselves from the knot, when the side pin $p^{12}$ of the cam $g$ engages with the bell-crank lever E' and restores the tube and rod to their first positions, ready to tie the next band. Of course the knot is pushed out and the next gavel raked against the needle-twine pushes the bound sheaf off of the platform. As with other devices for raking and binding grain, a clutch-coupling under the control of the driver of the reaper should be provided, to throw the automatic apparatus temporarily out of gear to permit backing, and to accommodate its action in conformity with the crop.

I claim as my invention—

1. The reciprocating hook-bar T″ and sliding jaw T′, in combination with a vibrating needle-bar, carrying the binding-twine and the spring-clamp a′, operated in connection with the tying-cylinder M, the several parts being arranged and actuated substantially as and for the purpose set forth.

2. The knife K, actuated as described, in combination with the clamping devices a′ and T′ T″, the several parts being arranged to operate substantially as described.

3. The tying-cylinder M, rotating intermittently and provided with spring-clamp a′, in combination with the inclosed sliding tube U, looping-rod V, and finger-bar F, said tube and rod having a differential and simultaneous movement imparted to them by means of the link-frame, as described, the several parts being arranged to operate substantially as and for the purpose set forth.

FRANCIS W. RANDALL.

Witnesses:
WM. L. RAYMENT,
C. W. OSBORN.